United States Patent [19]

Wood

[11] Patent Number: 5,621,560

[45] Date of Patent: Apr. 15, 1997

[54] METHOD AND SYSTEM FOR REDUCING CHIRP IN EXTERNAL MODULATION

[75] Inventor: Thomas H. Wood, Holmdel, N.J.

[73] Assignee: Lucent Technologies Inc., Murray Hill, N.J.

[21] Appl. No.: 479,037

[22] Filed: Jun. 7, 1995

[51] Int. Cl.⁶ .................................................. H04B 10/00
[52] U.S. Cl. .......................... 359/161; 359/181; 359/173; 359/188; 385/14
[58] Field of Search ...................................... 359/161, 173, 359/181–186, 188, 245; 385/2, 8, 14

[56] References Cited

U.S. PATENT DOCUMENTS

| 5,303,079 | 4/1994 | Gnauck et al. | 359/188 |
| 5,420,868 | 5/1995 | Chraplyvy et al. | 319/173 |

OTHER PUBLICATIONS

L. Bickers et al., "Reduction of Laser Chirp in 1.5 μm DFB Lasers By Modulation Pulse Shaping", *Electron. Letts.*, vol. 21, No. 3, Jan. 1985, pp. 103–104.
R. Olshansky et al., "Reduction of Dynamic Linewidth in Single–Frequency Semiconductor Lasers", *Electron. Letts.*, vol. 20, No. 22, Oct. 1984, pp. 928–929.
M. Suzuki et al., "2.4 Gbits/s 100km Penalty–Free Conventional Fibre Transmission Experiments Using GaInAsP Electroabsorption Modulator", *Electron. Letts.*, vol 25, No. 3, Feb. 1989, pp. 192–193.
M. Nazarathy et al., "Progress in Externally Modulated AM CATV Transmission Systems" *J. Lightwave Techno.*, vol. 11, No. 1, Jan. 1993, pp. 82–86.
D. Marcuse et al., "Time–Dependent Simulation of a Laster–Modulator Combination", *IEEE J. of Quantum Electron.* vol. 30, No. 12, Dec. 1994, pp. 2743–2755.
M. Suzuki et al., "Electrical and Optical Interactions Between Integrated InGaAsP/InP DFB Lasers and Electroabsorption Modulators", *J. Lightwave Techno.*, vol. 6, No. 6, Jun. 1988, pp. 779–784.
T. H. Wood, "Multiple Quantum Well, (MQW) Waveguide Modulators", *J. Lightwave Technol.*, vol. 6, No. 6, Jun. 1988, pp. 743–757.
J.E. Zucker et al. "Quantum Well Interferometric Modulator Monolithically Integrated With 1–55 μm Tunable Distributed Bragg Reflector Laser", *Electron. Letts.* vol. 28, No. 20, Sep. 1992, pp. 1888–1889.

*Primary Examiner*—Wellington Chin
*Assistant Examiner*—Kinfe-Michael Negash

[57] ABSTRACT

In external modulation, chirp is reduced by modulating a laser light beam during a modulation period to maintain light returning to the laser substantially constant. Variations in at least one of the magnitude and phase of light returning to the laser from an external modulator are reduced during the modulation period. An external modulator divides and modulates the light in parallel along separate optical paths. Driving voltages are applied to modulators in each of the optical paths based on first and second parameters. The first driving parameter represents an intensity modulation. The second driving parameter varies depending upon the value of the first driving parameter during modulation to maintain the light returning to the laser substantially constant throughout the modulation period. For example, the second driving parameter can be a function of the first driving parameter during the modulation period to reduce variations in the magnitude and phase of light returning to the laser through the external modulator. According to a second embodiment, the external modulator has a first modulator and a second modulator optically coupled in series between a laser and two complementary output ports. The second modulator is biased during modulation to balance the phase of light passing through first and second output waveguides. With this configuration it is easier to operate the system to reduce variations in the light returning to the laser during modulation. Finally, optical interactions between the modulator and laser which give rise to chirp are further reduced by using two output ports. Accordingly, the modulated laser signal output from the integrated modulator travels greater distances with less pulse spreading over an optical medium.

21 Claims, 7 Drawing Sheets

METHOD AND SYSTEM FOR REDUCING CHIRP IN EXTERNAL MODULATION

BACKGROUND OF THE INVENTION

CROSS REFERENCE TO RELATED APPLICATIONS

This patent application is related to commonly owned, copending application Ser. No. 08/479,036, Attorney Docket No. 1470.0660000, entitled "Method and system for Reducing Chirp in an Optical Communication System," by Thomas H. Wood and Dietrich Marcuse, filed concurrently herewith, and incorporated herein by reference.

1. Field of the Invention

The present invention relates generally to a method and system for reducing chirp in optical communication and for providing a low-chirp laser modulator.

2. Related Art

During laser modulation, a minimum level of spectral broadening necessarily occurs. Chirp, however, is an excess of spectral broadening beyond the spectral width required for modulation. Because different wavelengths propagate at different speeds in a dispersive medium, such as an optical fiber, the presence of significant chirp causes greater pulse spreading for a modulated optical signal transmitted across a fiber optic network.

Thus, reducing chirp has long been desired in optical communication. Low-chirp modulated laser sources are especially necessary in long-haul, high bit rate optical fiber transmission systems where chirp-induced pulse distortion reduces performance and range.

Two general approaches are typically used to modulate laser light: direct modulation and external modulation. In direct modulation, a laser such as a laser diode, is directly modulated by an information signal to generate a modulated laser output. In external modulation, a modulator is used to modulate light from a laser source such as a laser diode. An information signal is then applied to the modulator rather than to the laser as in direct modulation.

Moreover, in external modulation, two different arrangements are commonly used for packaging the external modulator with respect to the laser source. The arrangement chosen also affects the amount of chirp. In the first arrangement, the modulator and laser are disposed on separate, discrete substrates. In the second arrangement, the modulator and laser are fabricated as an integrated modulator substrate on a single chip.

Each of these laser modulation approaches involve chirp. Under a direct modulation approach, the amount of chirp can be proportional to changes in the log of the laser output power over time. Thus, high-speed direct modulation of a laser output can produce substantial chirp, especially when the laser is driven to create sharp laser pulses with abrupt rising and falling edges. See, for instance, the Bickers and Westbrook article which describes reducing laser chirp in direct modulation by smoothing modulation pulse transitions ("Reduction of Laser Chirp in 1.5 µm DFB Lasers By Modulation Pulse Shaping," Electron. Letts. 21 (3): 103–104 (31st Jan. 1985)), and the Olshansky and Fye article which describes reducing chirp in direct modulation by using a small current step in the leading edge of the drive pulse (Olshansky, R. et al., "Reduction of Dynamic Linewidth in Single-Frequency Semiconductor Lasers," Electron. Letts. 20 (22):928–929 (25th Oct. 1984)), both of which are incorporated herein by reference.

External modulation is favored in applications sensitive to chirp, such as long-distance optical communications, where the excessive spectral broadening in the emitted modulated light due to chirp leads to a greater pulse distortion during propagation and a reduction in overall performance. In external modulation, however, chirp can further arise from electrical and optical interactions between the laser and the modulator. Thus, in the first external modulation arrangement discussed above, chirp can be reduced by isolating the discrete modulator and laser, electrically and optically, from each other. For instance, decoupling capacitors can be used to block stray DC current between the laser and modulator. An optical isolator which only allows light to travel in one direction can be inserted in a fiber or space between the laser and modulator to prevent reflections of light back from the modulator to the laser. See, for example, Suzuki, M., et al., "2.4 Gbit/s 100 km Penalty-Free Conventional Fibre Transmission Experiments Using GaInAsP Electroabsorption Modulator," *Electron. Letts.* 25 (3): 192–193 (2nd Feb. 1989); Nazarathy, M. et al., "Progress in Externally Modulated AM CATV Transmission Systems," *J. Lightwave Technol.* 11 (1):82–86 (January 1993); and U.S. Pat. No. 5,420,868, issued to Chraplyvy et al., all of which are incorporated herein by reference.

Fabricating the laser and modulator separately, however, is inefficient and costly compared to an integrated modulator arrangement. Separate fabrication increases the overall size and complexity of the device and requires at least an additional coupling fiber or optics between the laser and modulator.

The integrated modulators according to the second external modulation arrangement avoid the problems and inefficiencies associated with packaging the laser and modulator as separate, discrete components. The electrical and optical interactions between the laser and modulator in an integrated modulator, however, are complex. See, for instance, the computer modeling of an integrated laser and electro-absorptive modulator discussed in Marcuse, D. et al., "Time-Dependent Simulation of a Laster-Modulator Combination, *IEEE J. of Quantum Electron.* 30 (12):2743–2755 (December 1994), which is incorporated herein by reference.

The complex optical and electrical interactions between the laser and modulator in an integrated laser-modulator combination make the reduction of chirp even more essential for these devices to be practical for optical communications systems. Because the laser and modulator are disposed in close proximity to one another on the same chip in an integrated laser modulator, it is more difficult to electrically and optically isolate the laser and the modulator from each other. See, the discussion of electrical and optical interactions in Suzuki, M. et al., "Electrical and Optical Interactions Between Integrated InGaAsP/InP DFB Lasers and Electroabsorption Modulators," *J. Lightwave Technol.* 6 (6):779–784 (June 1988), which is incorporated herein by reference. In this 1988 Suzuki et al. article, RF bypass condensers are connected to the laser to reduce electrical coupling. Such condensers increase cost and reduce the available chip space. Anti-reflection (AR) coatings are provided on the end face of the modulator to reduce back reflections, but high quality AR coatings increase cost and complexity.

With respect to optical interactions, at present it is costly, if not impossible, to integrate an optical isolator on the same substrate with a laser and a modulator. Thus, one of the most effective ways of reducing chirp arising from back-reflected light in an external modulation arrangement (that is, placing an optical isolator in between the laser and modulator as shown in the above-cited 1989 Suzuki et al. article) is unavailable for an integrated modulator.

What is needed then are further ways of reducing chirp occurring in external laser modulation. Chirp needs to be reduced in both cases of external modulation, where the laser and modulator are configured as separate, discrete devices and where the laser and modulator form an integrated modulator. Especially in the case of an integrated modulator, those optical interactions between the modulator and laser which give rise to chirp need to be reduced.

SUMMARY OF THE INVENTION

The present invention is a method and system for reducing chirp in optical communication and for providing a low-chirp external modulation laser. According to a first aspect of the invention, chirp is reduced by externally modulating a laser light beam during a modulation period to maintain the light returning to the laser substantially constant. In this way, during external modulation, variations in at least one of the magnitude and phase of light returning to the laser from an external modulator are reduced during the modulation period. As a result, the modulated signal is emitted with less pulse spreading from chirp and can convey information through a dispersive medium, such as a long-distance optical fiber network, with greater performance and range.

According to a second aspect of the invention, optical interactions between the modulator and laser in an integrated laser-modulator combination which give rise to chirp are reduced by using a two-output modulator, rather than a conventional one-output modulator. Partial reflections return along two output waveguides and are combined in the modulator portion prior to impinging upon the laser. In this way, the light returning to the laser during modulation remains more constant. This aspect is especially important in an integrated modulator where alternative forms of optical isolation between laser and modulator are impractical. Providing two output ports as in the present invention further avoids the need for costly high-quality anti-reflection coatings at the exit face or slanting the exit face.

In a first embodiment of the present invention, an external modulator modulates light during the modulation period based on first and second driving parameters. The first driving parameter represents an intensity modulation for imparting information on the modulated light signal. The second driving parameter is then varied depending upon the value of the first driving parameter during modulation to maintain the light returning to the laser substantially constant throughout the modulation period.

Moreover, the external modulator divides and modulates the light in parallel along separate optical paths. Accordingly, driving voltages are applied to modulators in each of the optical paths based on the first and second parameters. The modulated light from each optical path is then optically coupled through two output waveguides to respective complementary output ports.

According to a further feature of the first embodiment, the second driving parameter is made a function of the first driving parameter during the modulation period to reduce variations in the magnitude and/or phase of light returning to the laser through the external modulator. For instance, the second parameter can be linearly proportional to the first driving parameter.

According to a second embodiment of the present invention, the external modulator has a first modulator and a second modulator optically coupled in series between a laser and two complementary output ports. The second modulator is provided along first and second output waveguides for further controlling modulation.

In particular, the second modulator is biased to balance the phase of light passing through the first and second output waveguides. The first modulator can then be used to impart information on the modulated light signal based on a first driving parameter without regard to the second driving parameter. Thus, by providing a second modulator in this configuration, it is easier to operate the system to reduce variations in the light returning to the laser during modulation. According to the further implementation of the second embodiment, a second modulator need only be provided in one of the output waveguides.

Both of the first and second embodiments can be applied to an external modulator fabricated as a separate, discrete component apart from the laser and to an external modulator integrated in close proximity with the laser on a common chip.

Further features and advantages of the present invention, as well as the structure and operation of various embodiments of the present invention, are described in detail below with reference to the accompanying drawings.

DETAILED DESCRIPTION OF THE PREFERRED EMBODIMENTS

The present invention is described with reference to the accompanying drawings. In the drawings, like reference numbers indicate identical or functionally similar elements. Additionally, the left-most digit(s) of a reference number identifies the drawing in which the reference number first appears.

Example Environment: Optical Communication

The present invention is described in terms of an example optical communication environment involving external modulation. Description in these terms is provided for convenience only. It is not intended that the invention be limited to application in this example environment. In fact, after reading the following description, it will become apparent to a person skilled in the relevant art how to implement the invention in alternative environments.

In this specification, "external modulation" is used to refer generally to both types of external modulation arrangements where the laser and modulator are separate, discrete components and where the laser and modulator form an integrated modulator. The terms "integrated modulator", "integrated laser modulator", "integrated laser-modulator combination," and similar equivalents thereof, are used interchangeably to refer to the external modulation arrangement where the laser and modulator are fabricated in close proximity on a common chip.

Optical Communication System

Figure 1:
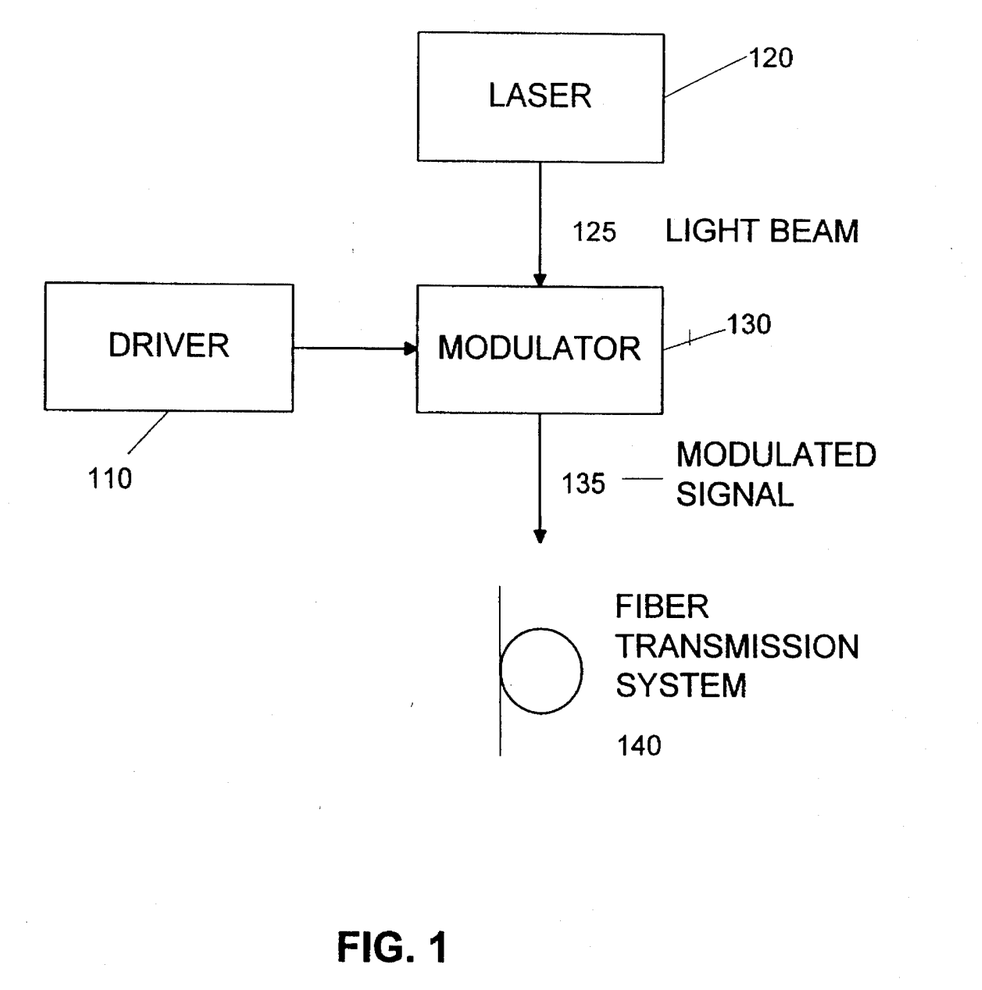
FIG. 1 is a block diagram of an optical communication system according to the present invention.

FIG. 1 is a block diagram of an optical communication system 100 according to the present invention. A laser 120 outputs a light beam 125 to a modulator 130. In this external modulation arrangement, the laser 120 and modulator 130 can be packaged as separate, discrete components or as an integrated modulator. A driver 110 drives the modulator 130 to provide a modulated signal 135 to fiber transmission system 140.

The driver 110 applies drive signals to the modulator 130 to modulate the light beam 125. In particular, driver 110 drives the modulator 130 to impart information on the modulated signal 135 for transmission over the fiber transmission system 140. For instance, a signal generator, such as a conventional non-return to zero NRZ drive circuit, can be used. Electro-optic and electro-absorptive types of modulators having a changing index of refraction based on an applied electric potential can be used to modulate the light. Modulators based on current-injection are another example of a suitable modulator 130.

To reduce chirp even further as described in the co-pending application incorporated by reference herein, a driver and modulator combination can be operated at a high-bandwidth to decrease pulse transitions in the modulated light signal. This can be implemented using a high-bandwidth driver and/or a high-bandwidth modulator.

In addition, a filter as described in the co-pending application can likewise be incorporated in driver 110 to provide a shaped information signal. In this way, pulse transition times in the driving signal applied to the modulator are reduced which translates to decreased pulse transitions, i.e. sharper rising and falling edges in the modulated light signal as well.

Other types of drive signal generators and modulators can be implemented as would be apparent to one skilled in the art.

Reducing Variations in the Light Returned to the Laser

According to a first aspect of the present invention, driver 110 further applies driving signals to modulator 130 during modulation to maintain the light returning to laser 120 substantially constant. In this way, during external modulation, variations in at least one of the magnitude and phase of light returning to the laser from an external modulator are reduced during the modulation period. This aspect of the present invention can be implemented in either an external modulator arrangement where the laser 120 and modulator 130 are fabricated as separate, discrete components or in an integrated laser-modulator combination.

According to a second aspect of the present invention, optical interactions between a modulator and laser which give rise to chirp are reduced by using a two-output modulator, rather than a conventional one-output modulator. See, for example, the one-output port integrated Mech-Zehnder modulator in Zucker, J. E. et al., "Quantum Well Interferometric Modulator Monolithically Integrated With 1–55 μm Tunable Distributed Bragg Reflector Laser," *Electron. Letts.* 28 (20):1888–1889 (24th Sep. 1992). Partial reflections return along two output waveguides and are combined in the modulator portion prior to impinging upon the laser. In this way, the magnitude and/or phase of light returning to the laser during modulation remains more constant. This aspect is especially important in an integrated modulator where alternative forms of optical isolation between laser and modulator are impractical.

The operation of each of these aspects of the present invention in external modulation will become even more clear in the description of the specific embodiments combining these aspects below.

Two-Port Integrated Modulator

Figure 2:
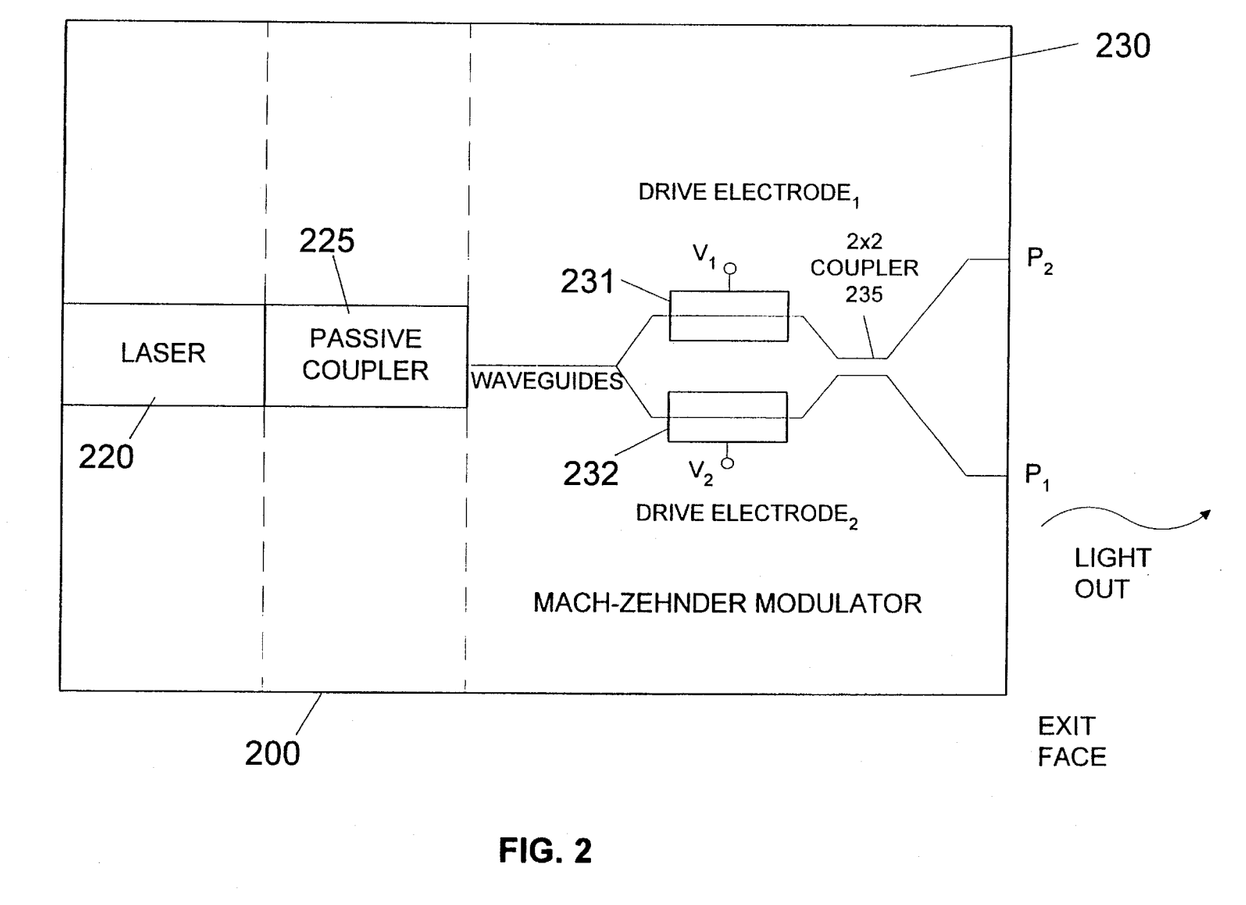
FIG. 2 is an example of an integrated modulator according to the present invention having a Mach-Zehnder modulator region.

FIG. 2 shows a first low-chirp integrated modulator according to the present invention having a Mach-Zehnder modulator region. Laser 220 and modulator 230 are integrated on the same substrate 200. A passive coupler 225 couples light from laser 220 to modulator 230.

Modulator 230 consists of a 1×2 Mach-Zehnder modulator having two modulators 231 and 232 for modulating light in response to the voltages $V_1$ and $V_2$ applied to their respective drive electrodes. The modulated light from each modulator 231 and 232 is then optically coupled in a 2×2 coupler region 235 to two output waveguides and then to ports P1 and P2. Each port P1 or P2 can be further coupled to a respective fiber transmission system or receiver (not shown). For simplicity, light is shown in FIG. 2 only exiting from port P1; however, it would readily apparent to one of ordinary skill in the art that light from both ports can be used to provide complementary data to a common optical receiver or to separate optical receivers.

By using two ports, light reflects from each exit face of the two output ports P1 and P2 and re-combines in modulator 230 before passing to the laser 220. Compared to conventional integrated modulators using one output port, the magnitude and/or phase of returning light passing back to the laser is maintained more constant during modulation, regardless of the voltages $V_1$ and $V_2$ applied to the modulator.

Driving voltages $V_1$ and $V_2$ are further used to control modulation to impart information on the modulated signal and to further maintain the magnitude and/or phase of the returning light substantially constant throughout the period of modulation. In this manner, chirp in the emitted modulated laser signal is reduced.

Figure 3:
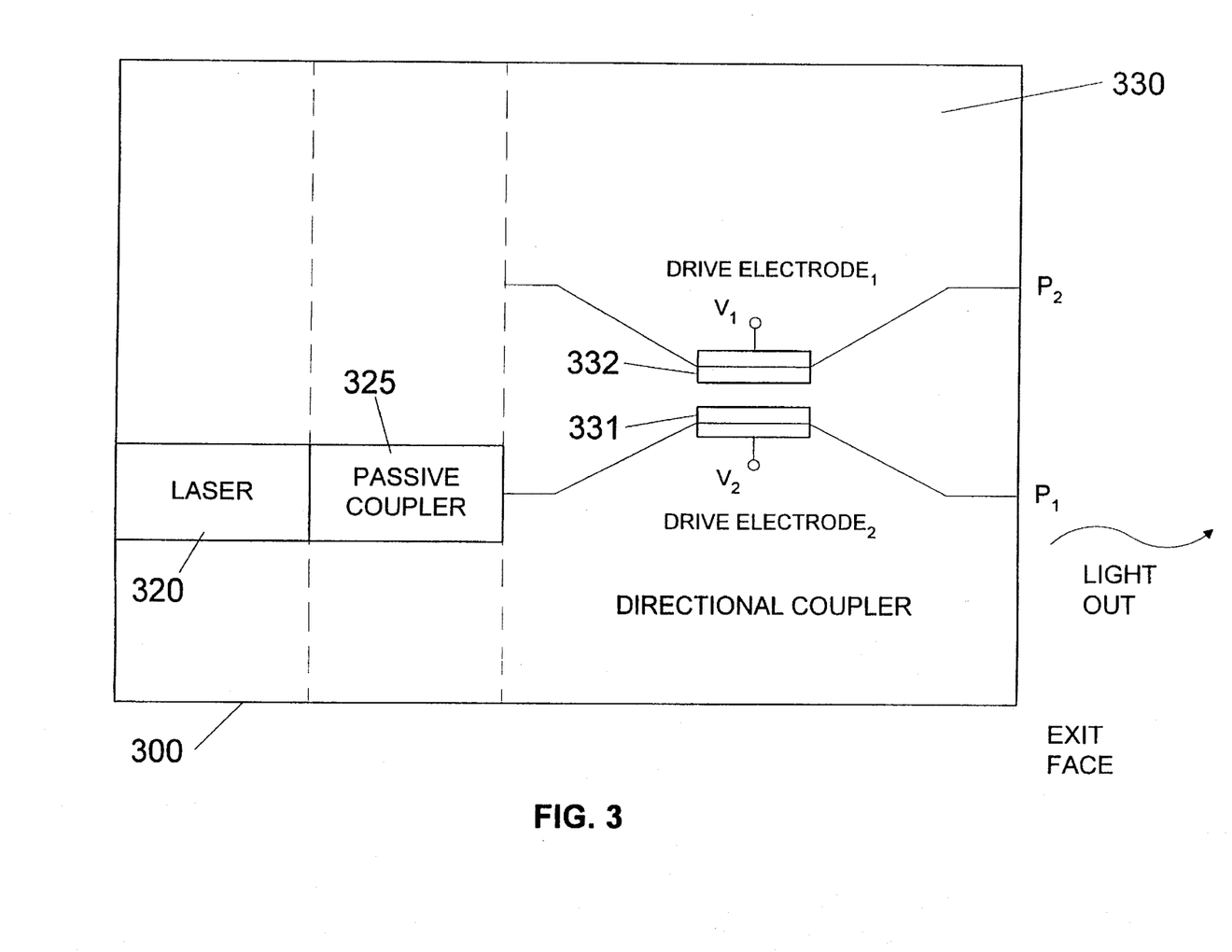
FIG. 3 is an example of an integrated modulator according to the present invention having a directional coupler modulator region.

FIG. 3 shows a second low-chirp integrated modulator according to the present invention having a directional coupler modulator region. Laser 320 and modulator 330 are integrated on the same substrate 300. A passive coupler 325 couples light from laser 320 to modulator 330.

Modulator 330 consists of a 2×2 directional coupler having two modulators 331 and 332 for modulating light in response to the voltages $V_1$ and $V_2$ applied to their respective drive electrodes. The modulated light from each modulator 331 and 332 is then optically coupled through two output waveguides to ports P1 and P2. Each port P1 or P2 can be further coupled to a respective fiber transmission system or receiver (not shown). For simplicity, light is shown in FIG. 3 only exiting from port P1; however, it would readily apparent to one of ordinary skill in the art that light from both ports can be used to provide complementary data to a common optical receiver or to separate optical receivers. This directional coupler configuration simplifies the requisite waveguides needed through the modulator 330 compared to those in the Mach-Zehnder configuration of FIG. 2.

As explained above with respect to FIG. 2, by using two ports, light reflects from each exit face of the two output ports P1 and P2 and recombines in modulator 330 before passing to the laser 320. Compared to conventional integrated modulators using one output port, the magnitude and/or phase of returning light passing back to the laser is maintained more constant during modulation, regardless of the voltages $V_1$ and $V_2$ applied to the modulator. Driving voltages $V_1$ and $V_2$ are further used to control modulation to impart information on the modulated signal and to further maintain the magnitude and/or phase of the returning light substantially constant throughout the period of modulation. In this manner, chirp in the emitted modulated laser signal is reduced.

In both FIGS. 2 and 3, lasers 220 and 320 can be an integrated distributed feedback DFB or Bragg reflection DBR laser. The modulators 231, 232, 331, and 332 can be electro-optic modulators, such as multiple-quantum well modulators. See, e.g., Wood, T. H., "Multiple Quantum Well (MQW) Waveguide Modulators," *J. Lightwave Technol.* 6 (6):743–757 (June 1988), incorporated herein by reference. Other well-known types of integrated laser and modulator combinations can be used, for instance, integrated modulators based on current injection.

Thus, optical interactions giving rise to chirp in an integrated laser modulator are reduced by utilizing a modulator having at least two ports at the exit face, as found in a 1×2 or 2×2 coupling switch. Heretofore, two-output port modulators, for instance, Balanced Bridge Interferometers and 1×2 or 2×2 directional coupler, have only been practically available in external modulation arrangements where the modulator is separate from the laser source as discussed with respect to FIG. 6 of the Nazarathy et al. article.

The amount of chirp depends upon fluctuations in the power of light returning to the laser. By studying the complex optical interactions between a laser and modulator in an integrated modulator, the inventors have discovered that two complementary output port can be used as described with respect to FIGS. 2 and 3 to maintain the light re-injected to the laser during modulation more constant over time compared to using a single output port.

Figure 4A:
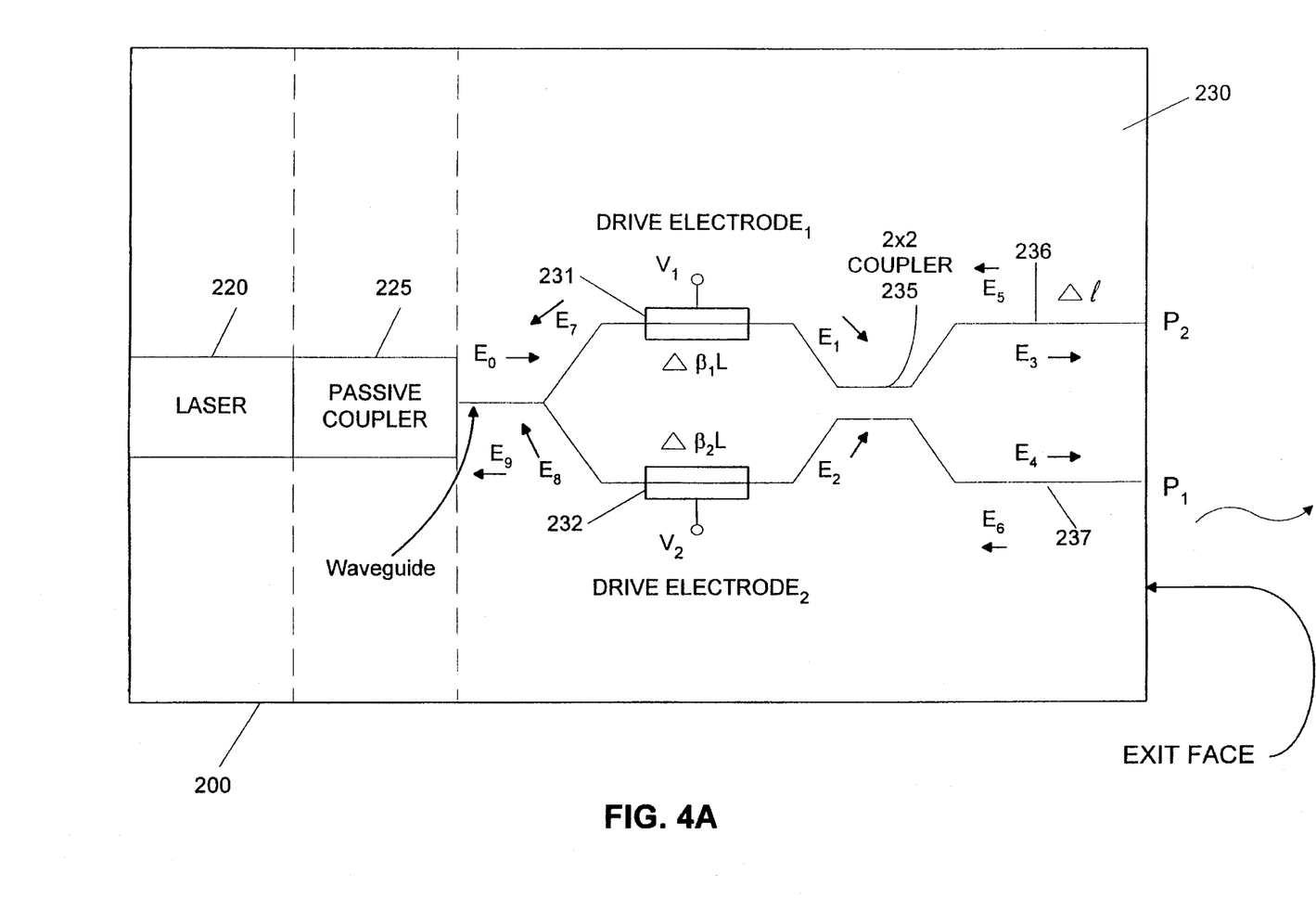
FIG. 4A shows the integrated modulator of FIG. 2 in connection with its operation according to the present invention.
Figure 4B:
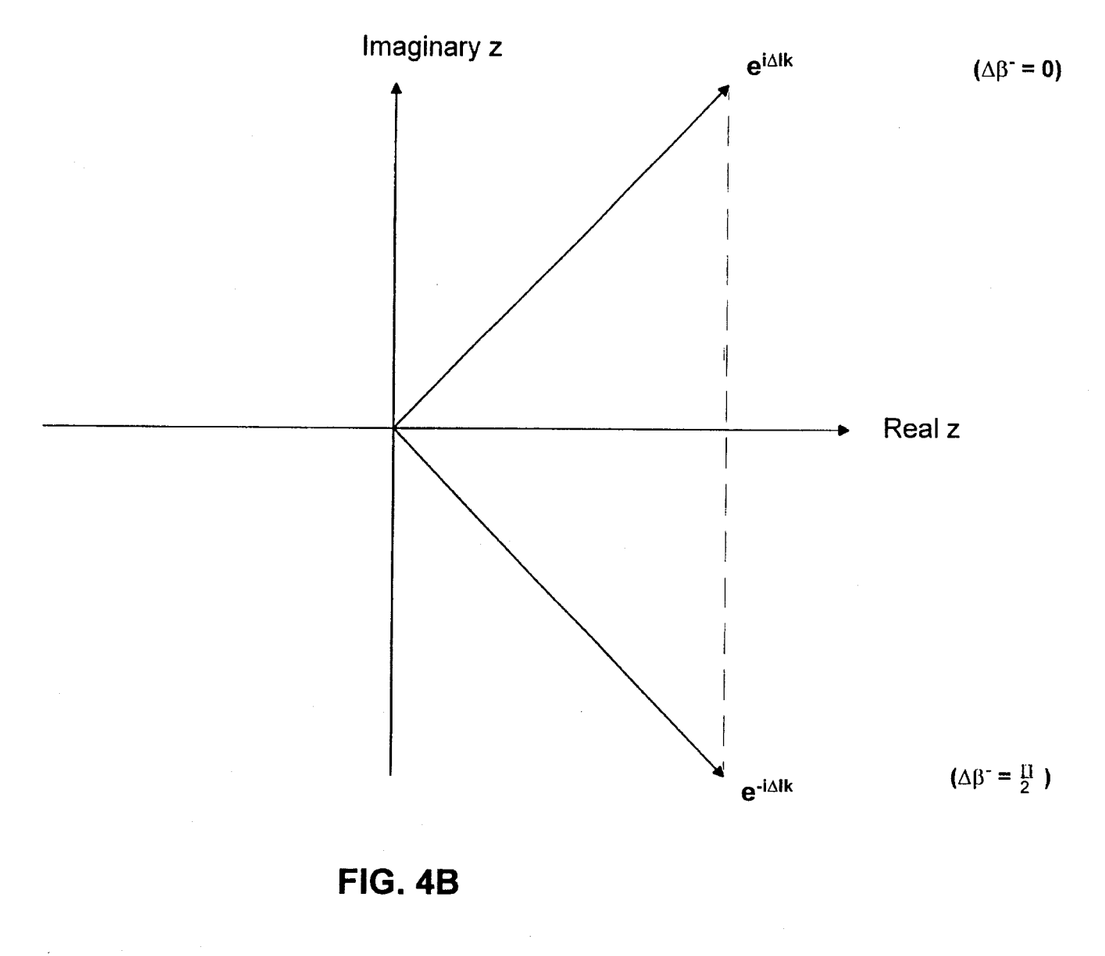
FIG. 4B shows in a complex plane a variation of an electric field component of returning laser light.

The inventor has further discovered, however, that despite the presence of two output ports the power of light returning to the laser necessarily fluctuates due to changes in the phase of returning light during modulation. Thus, according to the first aspect of the invention mentioned above, the inventor provides additional phase control during the course of modulation. In particular, the inventor has discovered a method and system for further reducing chirp in external modulation by driving modulators such that the magnitude and/or phase of light returning to the laser also remains substantially constant during intensity modulation. This operation according to the present invention will be described in more detail with respect to FIG. 4.

Operation

Magnitude and Phase Control During Modulation

FIG. 4A shows the integrated modulator of FIG. 2 in connection with its operation according to the present invention. In this device, the output of the single-frequency laser 220 has an optical electric field value $E_0$. The light from the laser is routed through passive coupler 225 to the Mach-Zehnder modulator 230 with two output waveguide branches 236 and 237 having the modulators 231 and 232 respectively. The electro-optic effect under the two driving electrodes introduces phase modulation to the optical electric fields $E_1$ and $E_2$:

$$E_1 = \frac{1}{\sqrt{2}} E_0 e^{i\Delta\beta_1 L} \quad (1)$$

$$E_2 = \frac{1}{\sqrt{2}} E_0 e^{i\Delta\beta_2 L} \quad (2)$$

$$\Delta\beta_1 = \frac{2\pi}{\lambda} \Delta n_{1eff},$$

where $\lambda$=wavelength of light in vacuum, $\Delta n_{1\,eff}$ is the change in the waveguide effective refractive index through modulator 231, and L is the length of the waveguide.

$$\Delta\beta_2 = \frac{2\pi}{\lambda} \Delta n_{2eff},$$

where $\lambda$=wavelength of light in vacuum, $\Delta n_{2\,eff}$ is the change in the waveguide effective refractive index through modulator 232, and L is the length of the waveguide.

The output of the 2×2 coupler region 233 are light with electric fields $E_3$ and $E_4$.

$$E_3 = \frac{1}{\sqrt{2}} (E_1 + E_2) = E_0 \cos(\Delta\beta^- L) e^{i\Delta\beta^+ L} \quad (3)$$

$$E_4 = \frac{1}{\sqrt{2}} (E_1 - E_2) = E_0 \sin(\Delta\beta^- L) e^{i\Delta\beta^+ L} \quad (4)$$

where $$\Delta\beta^+ \equiv \frac{\Delta\beta_1 + \Delta\beta_2}{2} \text{ and } \Delta\beta^- \equiv \frac{\Delta\beta_1 - \Delta\beta_2}{2} \quad (5)$$

or, alternatively, $$\Delta\beta_1 \equiv \Delta\beta^- + \Delta\beta^+ \text{ and } \Delta\beta_2 \equiv \Delta\beta^+ - \Delta\beta^-$$

These are well-known equations of a 1×2 Mach-Zehnder. The output powers are:

$$P_3 = |E_3|^2 = |E_0|^2 \cos^2(\Delta\beta^- L) \quad (6)$$

$$P_4 = |E_4|^2 = |E_0|^2 \sin^2(\Delta\beta^- L) \quad (7)$$

Intensity modulation can thus be achieved by varying $\Delta\beta^-$ from 0 to $$\frac{\pi}{2}.$$

To minimize the output phase modulation, and thus the chirp, the conventional techniques relying on Eqs. (3) and (4) alone teach operating with $\Delta\beta^+=0$. The present invention, however, moves further and considers reducing variations in the magnitude and phase of light returning to the laser during modulation. In particular, variations in the electric field $E_9$ during modulation are considered.

First, because of inevitable fabrication errors, there is a small difference $\Delta l$ between the upper and lower effective optical path lengths of waveguides 236 and 237. In reality, there is also some non-zero optical reflectivity of the output facet, R. Taking these conditions into account, the reflected light electric fields $E_5$ and $E_6$ are given by $$E_5 = \sqrt{R} \; E_3 \, e^{2i\Delta lk} \text{ where } k = \frac{2\pi n_{eff}}{\lambda} \quad (8)$$

and $n_{eff}$ is the effective refractive index of the waveguides 236 and 237; and $$E_6 = \sqrt{R}\, E_4 \qquad (9)$$

Then, the backward propagating fields $E_7$ and $E_8$ are calculated to be:

$$E_7 = \frac{1}{\sqrt{2}} (E_5 + E_6) e^{i\Delta\beta_1 L} \qquad (10)$$

$$E_8 = \frac{1}{\sqrt{2}} (E_5 - E_6) e^{i\Delta\beta_2 L} \qquad (11)$$

Finally, the backward propagating light field re-injected into the laser, $E_9$, is given by $$E_9 = \frac{1}{\sqrt{2}} (E_7 + E_8) \qquad (12)$$

Combining Eqs. (10) and (11) into Eq. (12) yields:

$$E_9 = \sqrt{R}\, E_0 e^{i\Delta lk} \{e^{i\Delta lk}\cos^2(\Delta\beta^-) + e^{-i\Delta lk}\sin^2(\Delta\beta^-)\} e^{i2\Delta\beta^+ L} \qquad (13)$$

To analyze the effect of modulation on the returning light, consider the bracketed term in Eq. (13) for the electric field $E_9$. As shown in FIG. 4B, in the complex plane, this bracketed quantity is a vector that moves from $e^{+i\Delta lk}$ to $e^{-i\Delta lk}$ as the driving parameter $\Delta\beta^-$ moves from 0 to $$\frac{\pi}{2}$$

(i.e., as the modulator modulates). In fact, this term has a constant Real part at the endpoints as indicated by the dashed line. From Eq. (13) it is evident, then, that if the second driving parameter is set to zero as in conventional techniques, i.e. $\Delta\beta^+=0$, the $E_9$ vector will also move over this wide range of values during modulation, resulting in large chirp.

According to the present invention, the second driving parameter $\Delta\beta^+$ can vary during modulation to reduce the variation in $E_9$ during modulation. For example, considering the endpoints of the intensity modulation, the following condition can be effectuated: $E_9$ (at $\Delta\beta^-=0$) $E_9$ (at $$\Delta\beta^- = \frac{\pi}{2}\ ).$$

In establishing the driving voltages according to this condition, an arbitrary choice can be made to simplify the determination of the first and second driving parameters as follows such that $\Delta\beta^+=0$ when $\Delta\beta^-=0$. Implementing this condition in Eq. (13) for $E_9$ results in $$e^{+i\Delta lk} = e^{-i\Delta lk} e^{i2\Delta\beta^+_{max} L} \qquad (14)$$

which simplifies to $$\Delta\beta_{max}^+ L = \Delta\alpha lk \qquad (15)$$

where $\Delta\beta_{max}^+$ equals the value of $\Delta\beta^+$ when $\Delta\beta^-$ equals $$\frac{\pi}{2}.$$

According to a simple, effective implementation of the present invention, then, the driving parameters $\Delta\beta^+$ and $\Delta\beta^-$ can be chosen to be proportional. Then Eq. (15) is satisfied with $$\Delta\beta^+ = \frac{2}{\pi} \Delta lk \cdot \Delta\beta^- \qquad (16)$$

Applying driving parameters which satisfy Eq. (16) then reduces the variation in returning light. In particular, a comparison of the values for $E_9$ given in Eq. (13) when the second driving parameter $\Delta\beta^+$ equals zero according to conventional techniques and when $\Delta\beta^+$ is given by Eq. (16), reveals the electric field $E_9$ remains substantially more constant during modulation, i.e. when first driving parameter $\Delta\beta^-$ moves from 0 to $$\frac{\pi}{2}.$$

Thus, this reduced variation in $E_9$ will translate into reduced chirping when driving voltages $V_1$ and $V_2$ determined by $\Delta\beta_1$ and $\Delta\beta_2$ as given in Eq. (5) are applied to modulators 231 and 232 during modulation to produce the values of $\Delta\beta^+$ indicated in Eq. (16). This teaches away from the conventional techniques which teach operation with $\Delta\beta^+=0$ to reduce chirp out of the modulator, but fail to account for the complex optical interactions in an integrated modulator. Although $\Delta\beta^+=0$ would be optimum if reflectivity $R=0$, the present invention realizes that in more practical applications a lower composite chirp can be attained from integrated modulator structures with $R \ne 0$ by operating with $\Delta\beta^+$ as in Eq. (16).

The biasing scheme for $\Delta\beta^+$ according to Eq. (16) is one example for reducing variations in the magnitude and/or phase of the electric field $E_9$. Other relationships between the second driving parameter and the first driving parameter would be apparent to one skilled in the art with the benefit of the above discussion. In general, the goal should be to reduce the variation in $E_9$ in Eq. (13) during modulation, that is, as $\Delta\beta^-$ varies from 0 to $$\frac{\pi}{2}.$$

Phase Control through an Additional Modulator Leg

In another implementation of the present invention, the goal of reducing variations in the returning light, that is, variations in the magnitude and/or phase of $E_9$, can be realized by adding one or two modulators along the two output waveguides. These additional modulators reduce variations in the returning light but are even easier to operate to reduce chirp.

Figure 5:
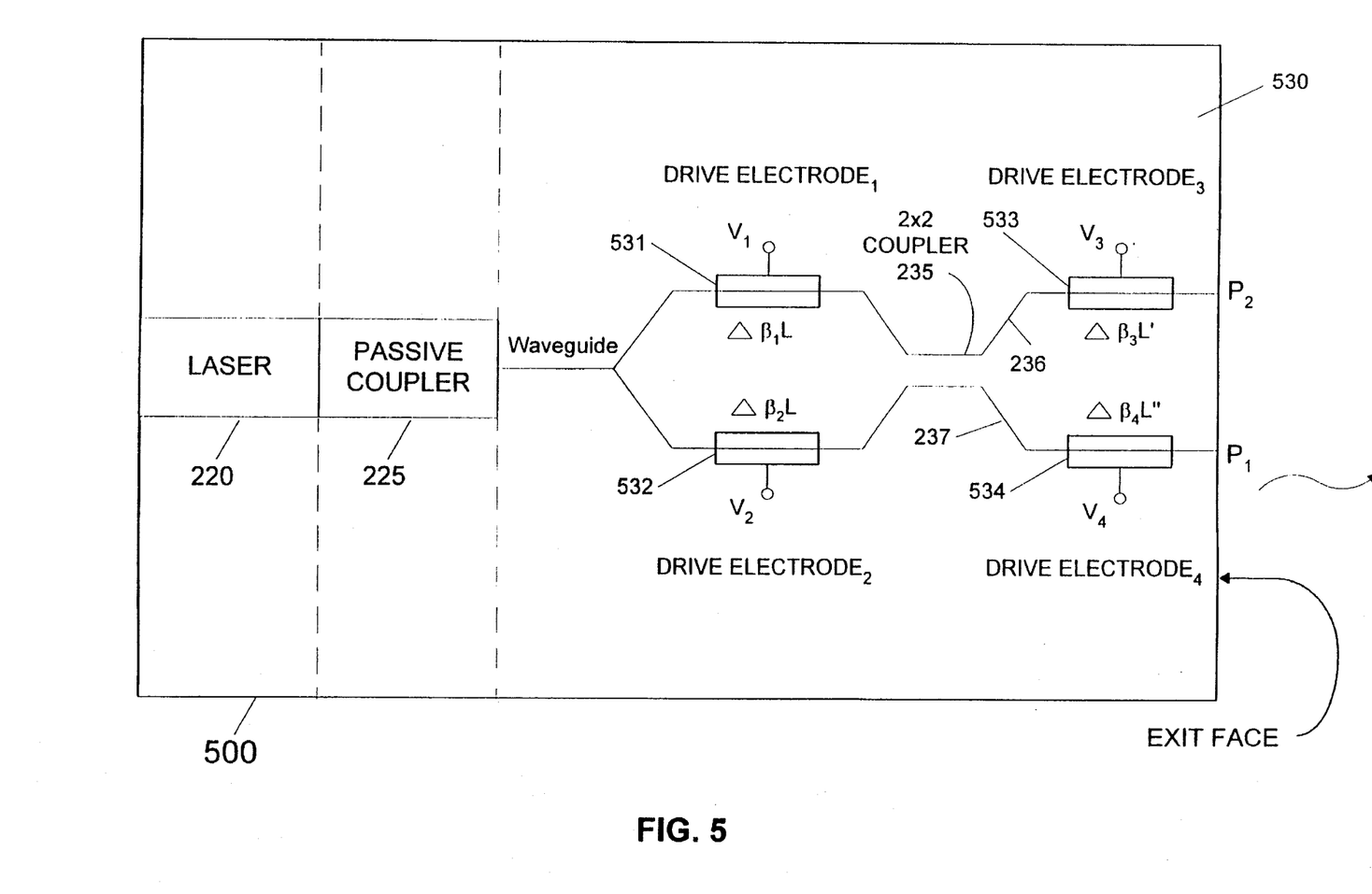
FIG. 5 shows an integrated modulator for modulating light along output waveguides according to the present invention.

FIG. 5 shows an integrated modulator for modulating light along two output waveguides leading to ports $P_1$ and $P_2$ according to the present invention. Laser 220 and modulator 530 are integrated on the same substrate 500. A passive coupler 225 couples light from laser 220 to modulator 530.

Modulator 530 consists of a 1×2 Mach-Zehnder modulator having two modulators 531 and 532 for modulating light in response to the voltages $V_1$ and $V_2$ applied to their respective drive electrodes. The modulated light from each modulator 531 and 532 is then optically coupled in a 2×2 coupler region 235 to two output waveguides and then to ports P1 and P2. Each port P1 or P2 can be further coupled to a respective fiber transmission system or receiver (not shown). For simplicity, light is shown in FIG. 5 only exiting from port P1; however, it would readily apparent to one of ordinary skill in the art that light from both ports can be used to provide complementary data to a common optical receiver or to separate optical receivers.

As shown in FIG. 5, two additional modulators 533 and 534 are provided along each of the two output waveguides leading to the ports P1 and P2. Each of these modulate light in response to the voltages $V_3$ and $V_4$ applied to their respective drive electrodes. In this arrangement, to reduce variation in the returning laser light only the DC bias of the voltages $V_3$ and $V_4$ needs to be adjusted. By adjusting the DC bias voltages properly, the variation in $E_9$ can be minimized regardless of the values of the second driving parameter $\Delta\beta^+$.

Variations in the electric field $E_9$ of the light returning to laser 220 in FIG. 5 is analyzed similar to that discussed above with respect to FIG. 4A, thus, only the new considerations introduced by the presence of modulators 533 and 534 will be described.

In particular, new driving electrodes of length L' and L" are added. These introduce additional phase modulations $e^{i\Delta\beta^3L'}$ and $e^{i\Delta\beta^4L''}$ in the two output waveguides 236 and 237. Here again $$\Delta\beta_3 = \frac{2\pi}{\lambda} \Delta n_{3\mathit{eff}}$$

and $$\Delta\beta_4 = \frac{2\pi}{\lambda} \Delta n_{4\mathit{eff}}$$

where $\Delta n_{3\mathit{eff}}$ and $\Delta n_{4\mathit{eff}}$ equal the changes in the effective refractive index in the waveguides 236 and 237 respectively.

To reduce chirp, the DC bias $V_3$ and $V_4$ applied to the new electrodes are adjusted to balance the phase of the modulated light passing through the output waveguides so as to reduce variations in the electric field $E_9$ as given in Eq. (13). Applying this balanced phase condition of each electric field $E_3$ and $E_4$ into Eq. (13) results in the following expression relating changes in the third and fourth driving parameters $\Delta\beta_3$ and $\Delta 62_4$:

$$e^{2i\Delta\beta_3 L'} e^{i\Delta lk} e^{-2i\Delta\beta_4 L''} = \pm 1 \tag{17}$$

which simplifies to the following equation for setting the parameters $\Delta\alpha_3$ and $\Delta\beta_4$:

$$\Delta lk + 2\Delta\beta_3 L' - 2\Delta\beta_4 L'' = N\pi \tag{18}$$

where N is any integer.

Thus, maintaining the third and fourth driving parameters $\Delta\beta_3$ and $\Delta\beta_4$ according to the Eqs. (17) or (18) will have the effect of reducing $\Delta lk$ to 0 in Eq. (13), thereby, removing any variation in $E_9$, regardless of the values of $\Delta\beta^+$. In other words, to maintain the light returning to the laser during modulation substantially constant and reduce chirp in the integrated modulator of FIG. 5, the DC bias voltages $V_3$ and $V_4$ need only be set such that the respective third and fourth driving parameters $\Delta\beta_3$ and $\Delta\beta_4$ satisfy Eqs. (17) or (18). As result, even though this structure requires additional modulators 533 and 534, it is easier to operate.

Figure 6:
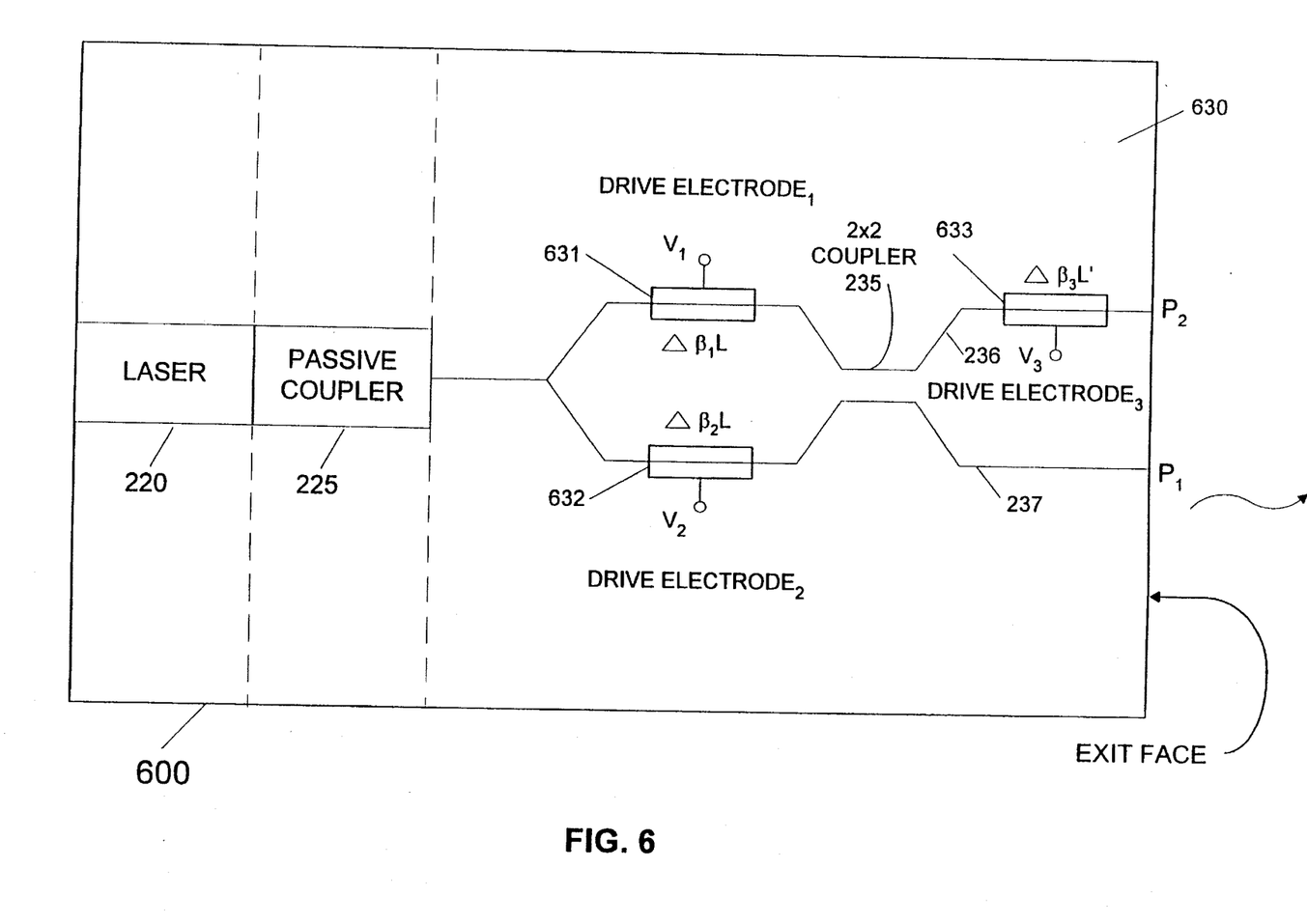
FIG. 6 shows an integrated modulator for modulating light along one output waveguide according to the present invention.

FIG. 6 shows an integrated modulator for modulating light along one output waveguide according to the present invention. Laser 220 and modulator 630 are integrated on the same substrate 600. A passive coupler 225 couples light from laser 220 to modulator 630.

Modulator 630 consists of a 1×2 Mach-Zehnder modulator having two modulators 631 and 632 for modulating light in response to the voltages $V_1$ and $V_2$ applied to their respective drive electrodes. The modulated light from each modulator 631 and 632 is then optically coupled in a 2×2 coupler region 235 to two output waveguides 236 and 237 and then to ports P1 and P2. Each port P1 or P2 can be further coupled to a respective fiber transmission system or receiver (not shown). For simplicity, light is shown in FIG. 6 only exiting from port P1; however, it would readily apparent to one of ordinary skill in the art that light from both ports can be used to provide complementary data to a common optical receiver or to separate optical receivers.

As shown in FIG. 6, an additional modulator 633 is provided along the output waveguide leading to the port P2. The modulator 633 modulates light in response to the voltage $V_3$ applied to its respective drive electrode. As in the FIG. 5, to reduce variation in the returning laser light only the DC bias of the voltage $V_3$ relating to $\Delta\beta_3$ needs to be adjusted. By adjusting the DC bias voltage $V_3$ properly, the variation in $E_9$ can be minimized regardless of the values of the second driving parameter $\Delta\beta^+$.

Variations in the electric field $E_9$ Of the light returning to laser 220 in FIG. 6 is analyzed similar to that discussed above with respect to FIGS. 4A and 5, thus, only the new considerations introduced by the presence of the modulator 633 will be described. In particular, a new driving electrode of length L' is added introducing an additional phase modulation as described with respect to FIG. 5 in the optical path 236 through the modulator 630. As with the FIG. 5 structure, to reduce chirp the DC bias $V_3$ needs only to be applied to the new driving electrode to balance the phase of the modulated light passing through the output waveguides 236 and 237, thereby, reducing variations in the electric field $E_9$ as given in Eq. (13). Applying this balanced phase condition of each electric field $E_3$ and $E_4$ into Eq. (13) results in the following expressions describing changes in the third driving parameter $\Delta\beta_3$:

$$e^{2i\Delta\beta_3 L'} e^{i\Delta lk} = \pm 1 \tag{19}$$

which simplifies to the following equation for setting parameter $\Delta\beta_3$:

$$\Delta lk + 2\Delta\beta_3 L' = N\pi \tag{20}$$

where N is any integer.

The third driving parameter $\Delta\beta_3$ then need only be maintained according to the Eqs. (19) or (20) to have the effect of reducing $\Delta lk$ to 0 in Eq. (13), thereby, removing any variation in $E_9$, regardless of the values of $\Delta\beta^+$. In other words, to maintain the light returning to the laser during modulation substantially constant and reduce chirp in the integrated modulator of FIG. 6, the DC bias voltage $V_3$ need only be set such that the third driving parameter $\Delta\beta_3$ satisfies Eqs. (19) or (20). As result, this structure is even simpler and easier to operate than the structure of FIG. 5.

Alternatively, it would be apparent to one skill in the art that the additional modulator 633 could be provided in the output waveguide 237 leading to port $P_1$.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical communication system for reducing chirp in a modulated light signal transmitting information over an optical medium comprising:

laser source means for producing a light beam; and modulator means for modulating said light beam with an information signal during a modulation period to produce said modulated light signal, and for modulating light returning to the laser source means through the modulator means to maintain the returning light substantially constant during said modulation period.

2. The optical communication system according to claim 1, wherein said modulator means modulates said light beam during said modulation period to maintain at least one of the magnitude and phase of said returning light substantially constant.

3. The optical communication system according to claim 1, wherein said modulator means modulates said light beam during said modulation period based on first and second driving parameters, said first driving parameter being representative of an intensity modulation for said information signal and said second driving parameter being varied in response to said first driving parameter during said modulation period to maintain said returning light substantially constant.

4. The optical communication system according to claim 3, wherein said modulator means comprises:

an input waveguide for receiving said light beam from said laser source; and a Mach-Zehnder modulator optically coupled between said input waveguide and an optical coupling means, said Mach-Zehnder modulator dividing said light beam between first and second optical paths, modulating said light in each of said first and second optical paths, and recombining modulated light from each path at said optical coupling means; and further comprising first and second output waveguides for coupling modulated light from said optical coupling means to respective first and second output ports; wherein said modulated light signal is output from either of said first or second output ports.

5. The optical communication system according to claim 4, wherein said first optical path in said Mach-Zehnder modulator includes a first modulator for modulating light traveling through said first optical path, and wherein said second optical path in said Mach-Zehnder modulator includes a second modulator for modulating light traveling through said second optical path, said first modulator including a first control electrode means for applying a first driving voltage determined by at least said first and second driving parameters, and said second modulator including a second control electrode means for applying a second driving voltage determined by at least said first and second driving parameters.

6. The optical communication system according to claim 3, wherein said second driving parameter is linearly proportional to said first driving parameter.

7. The optical communication system according to claim 4, wherein said second driving parameter is made linearly proportional to said first driving parameter during said modulation period in accordance with the following equation:

$$\Delta\beta^+ = \frac{2}{\pi} \Delta lk \cdot \Delta\beta^-$$

where $\Delta\beta^+$ represents said second driving parameter, $\Delta\beta^-$ represents said first driving parameter which varies from $$\frac{\pi}{2}$$

during said intensity modulation for imparting said information on said modulated signal, $\Delta l$ equals the difference in the optical path lengths between said first and second output waveguides, and k represents a constant equal to $$k = \frac{2\pi n_{eff}}{\lambda},$$

where $\lambda$ is the wavelength of said light from said laser source means in a vacuum, and $n_{eff}$ is the effective refractive index in said first and second output waveguides.

8. The optical communication system according to claim 3, wherein said modulator means includes first and second modulators for modulating light from said laser source means along two paths, said first modulator including a first control electrode means for applying a first driving voltage determined by at least said first and second driving parameters, and said second modulator including a second control electrode means for applying a second driving voltage determined by at least said first and second driving parameters.

9. The optical communication system according to claim 1, wherein said laser source means and said modulator means are disposed on a common substrate.

10. The optical communication system according to claim 1, wherein said modulator means comprises a Mach-Zehnder modulator means optically coupled between said laser source means and two complementary first and second output ports; and first and second output waveguides for coupling said modulated light from said Mach-Zehnder modulator means to respective first and second output ports.

11. The optical communication system according to claim 1, wherein said modulator means comprises:

a directional coupler means optically coupled between said laser source means and two complementary first and second output ports; and first and second output waveguides for coupling said modulated light from said directional coupler means to respective first and second output ports, said directional coupler means modulating said light from said laser source means by switching said light between said first and second output waveguides.

12. The optical communication system according to claim 1, wherein said modulator means includes first and second output waveguides for coupling modulated light from said modulator means to respective first and second output ports, wherein light reflected back through said first and second output waveguides toward said modulator means is recombined such that the magnitude of said light returning to said laser source means is maintained substantially constant during said modulation period.

13. The optical communication system according to claim 12, wherein said laser source means and said modulator means are each disposed on a common integrated substrate, said first and second output ports being disposed on an output face of said integrated substrate; and wherein partial light reflections at said output face passing back through said first and second output waveguides are recombined in said modulator means and returned to said laser source means at a substantially constant magnitude during said modulation period.

14. An optical communication system for reducing chirp in a modulated light signal transmitting information over an optical medium comprising:

laser source means for producing a light beam; and modulator means for modulating said light beam during a modulation period to produce said modulated light signal, said laser source means and said modulator means being disposed on a common integrated substrate;

said modulator means including first and second output waveguides for coupling modulated light from said modulator means to respective first and second output ports, said modulator means modulating light returning to said laser source means to maintain the returning light substantially constant during said modulation period.

15. The optical communication system according to claim 14, wherein said first and second output ports are disposed on an output face of said integrated substrate, said output face being arranged substantially perpendicular to said first and second output waveguides at said first and second ports, wherein partial light reflections at said output face back through said first and second output waveguides are recombined in said modulator means and returned to said laser source means.

16. A low-chirp integrated laser modulator comprising:

laser source means for producing a light beam; and modulator means for modulating said light beam during a modulation period to produce said modulated light signal, said laser source means and said modulator means being disposed on a common integrated substrate;

said modulator means including first and second output waveguides for coupling modulated light from said modulator means to respective first and second output ports, said modulator means modulating light returning to said laser source means to maintain the returning light substantially constant during said modulation period.

17. A method for reducing chirp in an optical communication system, the method comprising the steps of:

emitting a light beam from a laser source means; and modulating said emitted laser light beam during a modulation period to produce a modulated light signal, wherein said modulating step modulates said emitted laser light beam to impart information on said modulated light signal and to modulate the light returning to the laser source means to maintain the returning light substantially constant during said modulation period.

18. The method for reducing chirp according to claim 17, wherein said modulating step modulates said light beam during said modulation period based on first and second driving parameters, said first driving parameter being representative of an intensity modulation for imparting said information on said modulated light signal and said second driving parameter being varied in response to said first driving parameter during said modulation period to maintain said light returning to the laser source means after said modulating step substantially constant.

19. The method for reducing chirp according to claim 17, wherein said modulating step includes the steps of:

driving a first modulator means to impart said information on said modulated light signal during said modulation, and adjusting a DC bias voltage for a second modulator means to balance the phase of light passing through first and second output waveguides such that the returning light to the laser source means is maintained substantially constant during said modulation period.

20. An optical communication system for reducing chirp in a modulated light signal transmitting information over an optical medium comprising:

laser source means for producing a light beam; and modulator means for modulating said light beam with an information signal during a modulation period to produce said modulated light signal and for maintaining light returning to the laser source means through the modulator means substantially constant during said modulation period, wherein said modulator means comprises:

a first modulator means being optically coupled between said laser source means and a second optical modulator means; said first modulator means modulating said light beam from said laser source in first and second optical paths to impart said information and providing modulated light from said first and second optical paths to said second modulator means; and said second modulator means including first and second output waveguides for coupling said modulated light from said first modulator means to respective first and second output ports, and first and second output modulators respectively provided along said first and second output waveguides, said first and second output modulators being driven to balance the phase of light passing through each of said first and second output waveguides such that said returning light is maintained substantially constant during said modulation period.

21. An optical communication system for reducing chirp in a modulated light signal transmitting information over an optical medium comprising:

laser source means for producing a light beam; and modulator means for modulating said light beam with an information signal during a modulation period to produce said modulated light signal and for maintaining light returning to the laser source means through the modulator means substantially constant during said modulation period, wherein said modulator means comprises:

a first modulator means optically coupled between said laser source means and a second optical modulator means, said first modulator means modulating said light beam from said laser source in first and second optical paths to impart said information and providing modulated light from said first and second optical paths to said second modulator means; and said second modulator means including first and second output waveguides for coupling said modulated light from said first modulator means to respective first and second output ports, and an output modulator provided along one of said first or second output waveguides, wherein said output modulator is driven to balance the phase of light passing through each of said first and second output waveguides such that the returning light to the laser source means is maintained substantially constant during said modulation period.

* * * * *